United States Patent [19]

Studer et al.

[11] Patent Number: 4,472,444

[45] Date of Patent: Sep. 18, 1984

[54] METHOD FOR STEMMING TOMATOES

[75] Inventors: Henry F. Studer; Richard A. Cavaletto, both of Davis, Calif.; Gene Giacomelli, North Brunswick, N.J.

[73] Assignees: The Regents of The University of California, Berkeley, Calif.

[21] Appl. No.: 397,904

[22] Filed: Jul. 13, 1982

[51] Int. Cl.³ .............................................. A23L 1/212
[52] U.S. Cl. .................................... 426/484; 15/3.16; 15/210 R; 99/637; 99/639
[58] Field of Search ................. 426/484; 99/639, 637; 15/3.16

[56] References Cited

U.S. PATENT DOCUMENTS

| | | | |
|---|---|---|---|
| 409,754 | 8/1889 | Phelps et al. | 15/3.16 |
| 603,029 | 4/1898 | Pettit, Jr. | 99/637 |
| 1,013,506 | 1/1912 | Miller et al. | 15/3.1 |
| 1,058,461 | 4/1913 | Porter | 15/3.16 |
| 1,234,697 | 7/1917 | Foote | 99/637 |
| 1,384,455 | 7/1921 | Ervin | 99/637 |
| 1,526,573 | 2/1925 | Triplett | 99/639 |
| 1,762,684 | 6/1930 | Frazier | 99/639 |
| 1,982,142 | 11/1934 | Peterson | 146/55 |
| 2,799,312 | 7/1957 | Ervin | 146/55 |
| 3,083,520 | 4/1963 | Thibault | 56/334 |
| 3,192,977 | 7/1965 | Bean | 99/586 |
| 3,855,765 | 12/1974 | Forkner et al. | 56/340 |

*Primary Examiner*—Steven L. Weinstein
*Attorney, Agent, or Firm*—Owen, Wickersham & Erickson

[57] ABSTRACT

Method and apparatus for de-stemming picked tomatoes. Each tomato is introduced into the upper end of a generally vertically disposed, open-ended, resilient, open-mesh fabric tube, a substantial portion of which approximates but is larger than the diameter of the tomato. The stem penetrates into and through the open mesh at some point, the open areas being somewhat larger than the stem, while the tomato continues to fall, thereby exerting a bending moment on the stem that snaps the stem from the fruit. The tomato, free from its stem, is discharged from a lower end of the tube.

33 Claims, 19 Drawing Figures

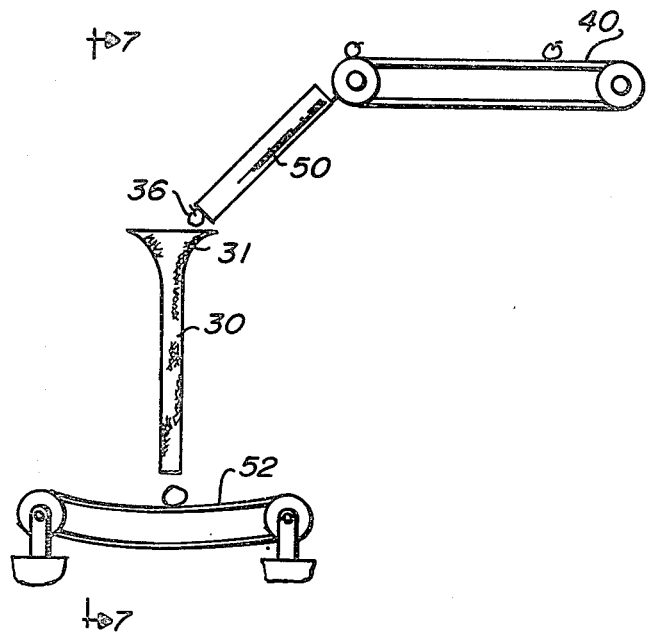
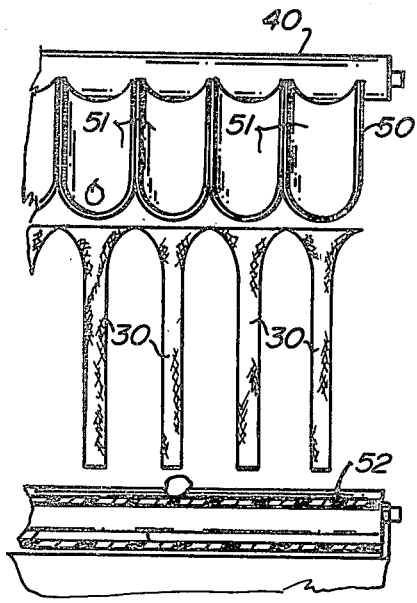
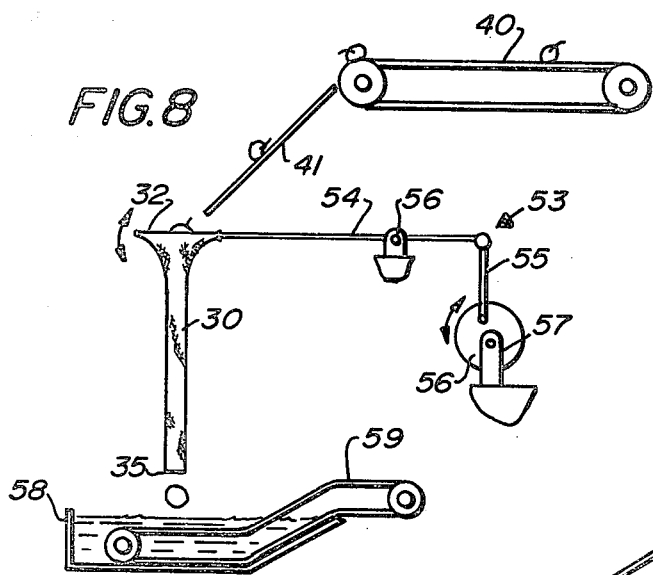
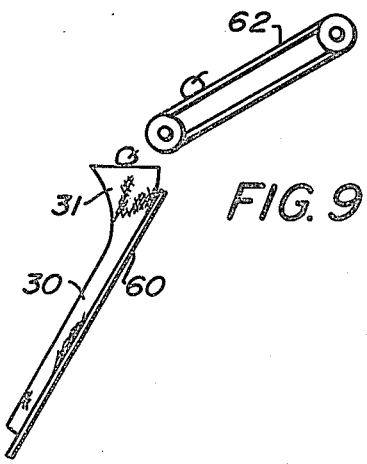
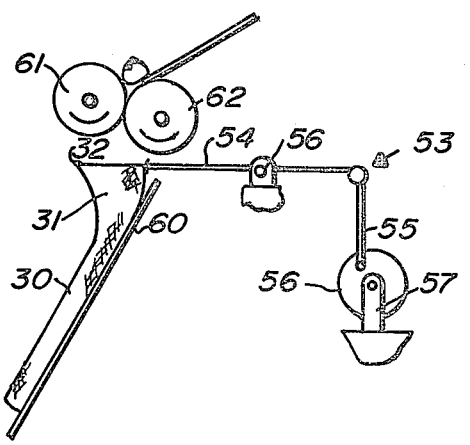

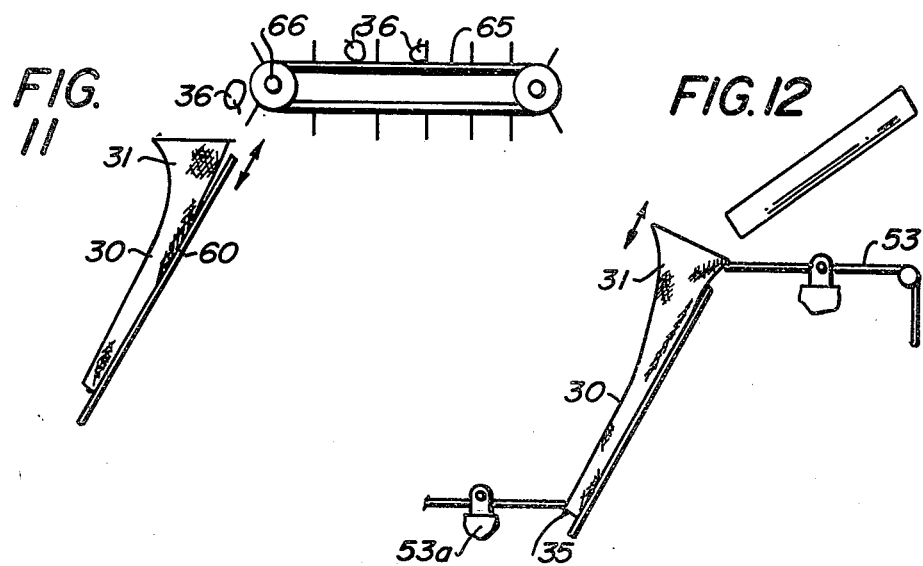
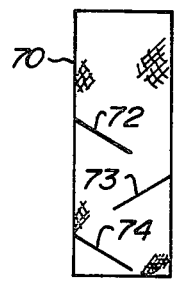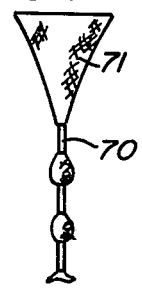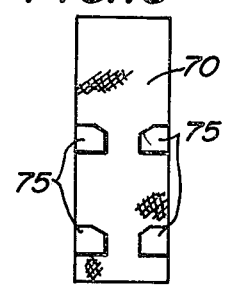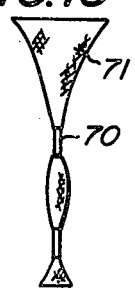
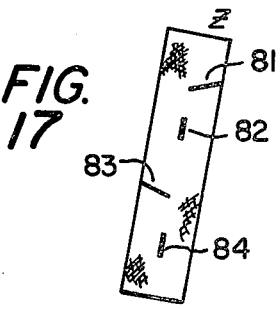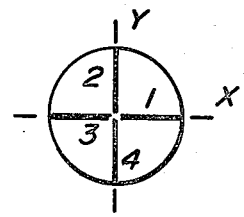
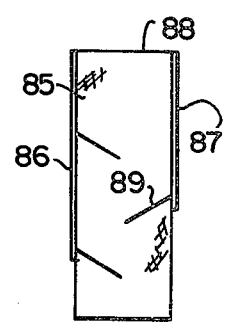

METHOD FOR STEMMING TOMATOES

BACKGROUND OF THE INVENTION

This invention relates to method and apparatus for removing the stems from tomatoes. These may be mature green tomatoes harvested for fresh market use, or they may be red ripe tomatoes for processing or canning. The invention is particularly applicable to tomatoes from plants of the jointed varieties.

Stems which are retained by tomatoes can cause puncture injury to both mature green and mature processing fruits. At any rate, they must be removed before peeled fruit can be canned as "whole peeled tomatoes".

In present commercial practice stem removal is done manually for the mature green tomatoes, and it may be done manually for processing tomatoes. Various food machinery manufacturers provide equipment which is claimed to be suitable for removing stems of processing tomatoes, but these machines are of very complicated mechanical construction, using rotating rods and shaker tables, and the machines suffer reliability and maintenance problems. These machines also tend to be rather agressive and can result in fruit damage. Also, they do not work well with tomatoes having relatively short straight stems, which are normal with jointed varieties.

Some de-stemming processes intended for use with other types of fruit are not suitable for tomatoes. Thus, Foote U.S. Pat. No. 1,234,697 rolled fruit down a large helical or spiral pipe. Peterson U.S. Pat. No. 1,982,142 detached grapes from their stems with oscillating ribs, the grapes then falling through large openings in a screen. Ervin U.S. Pat. No. 2,799,312 used a rubber-lined rotating helical tube to remove stems from berries and also rubbed the berries against fine fabric. Pettit U.S. Pat. No. 603,029 removed stems from currents and raisins by rolling them down and back and forth over a sieve surface that was penetrated by the stems, the fruit then breaking off. None of these processes nor their related apparatus are suitable for use with tomatoes.

Thus, many concepts have been explored. However, all these have either been complete failures with tomatoes or have been so complicated mechanically as to render them unsuitable for use in a commercial harvesting, packing, or processing operation.

A general object of this invention is to provide a practical, simple process and apparatus for de-stemming tomatoes rapidly and in large quantities while avoiding damage to the fruit.

Another object is to provide a method and apparatus for de-stemming tomatoes that apply whether the tomatoes are market tomatoes or canning or process tomatoes.

A further object is to provide for gently de-stemming tomatoes mechanically in an economical manner, especially tomatoes from jointed plant varieties.

Another object is to accomplish the de-stemming with minimum reliance on moving machinery parts, so as to reduce damage to fruit and to reduce or even eliminate hazards to workers.

SUMMARY OF THE INVENTION

According to the present invention, the tomatoes are introduced into a vertically oriented or substantially inclined sock made from a resilient open mesh material such as plastic, polyethylene, or nylon, for example. The stems of the tomatoes easily penetrate the mesh or webbed structure, which preferably lies in the range of 3/16" to ⅜" wide mesh openings. As the fruits drop down through the tubular mesh structure, the stems become trapped, and the fruits, as they continue to move downward, exert a bending moment on the stems, due to a combination of the effects of fruit weight and momentum. We have found that this bending moment is sufficient to snap the stems from the fruits. The fruits continue to fall downward through the tube and exit from the open lower end. The loose stems initially are retained in the sock, but are moved downward by the subsequent passage of additional fruits which follow, without harm to the fruit because they are detached. Thus, the fruits move through the sock in a relatively unimpeded fashion in many cases with velocities approaching free fall, and the detached stems are flushed from the sock by this same flow of fruit.

Sock-like members have been used for such things as slowing down the velocity of fruit between a fruit-tree picker and the ground, as in Thibault U.S. Pat. No. 3,083,520, and for other purposes unrelated to stem removal. For example, Miller et al., U.S. Pat. No. 1,013,506 used a sock-like structure for brushing dirt off peaches. Bean, U.S. Pat. No. 3,192,977, peeled tomatoes by abrasion against burlap or canvas along a tortuous path. Forkner et al., U.S. Pat. No. 3,855,765 slowed the velocity of descending fruit, while polishing and cleaning it. All of these effects are different from and generally inconsistant with the purposes of the present invention.

The present invention represents a major simplification of a process that currently is accomplished inefficiently, unreliably, and with complicated machinery. The near absence of moving machine parts represents a totally hazard-free situation. Sock maintenance requirements of the present invention depend on suitable choice of long wearing sock material. However, sock replacement can be done simply and inexpensively. Fruit handling is very gentle, and the fruit is never in contact with rapidly rotating and oscillating steel bars. Construction costs and space requirements are much less what is needed for existing commercial stemming equipment.

The efficiency of the stem detachment attained by the invention depends partly on the initial velocity of the fruits as they enter the upper end of the open sock, and partly on such things as fruit size, fruit variety, and stem characteristics. Large fruits are more easily de-stemmed than are small fruits for the same initial magnitude of fruit velocity and comparable stem lengths. Stems which are bent naturally so as to lie against the fruit surface and stems which are attached in turn to longer pieces of tomato vine are difficult to remove. Fortunately, the former characteristic is unusual for most processing tomatoes, and the frequency of occurance in the latter situation is still low, occuring mainly with jointless varieties for which existing tomato stemming equipment is well suited.

By far the most common situation (and the most troublesome in prior-art processes) is that of a tomato with a substantially straight stem, and the method and apparatus of the present invention are well suited to de-stem such tomatoes.

Initial tomato velocity can be obtained in several ways: (a) rolling the substantially round tomatoes down an inclined flat surface, the combination of linear velocity, $v$, and angular velocity, $\omega$, of the fruit as it exits the lower end of the surface providing the necessary momentum for stem detachment, (b) rolling the tomatoes down a set of inclined parallel, concave, troughs, the exit velocities from the troughs being much the same as for the flat surface, while, the trough configuration enables more precise control of fruit exit position and subsequent introduction of the fruits into the sock openings, an individual sock being provided for each trough, and (c) dropping the fruit, as from the end of a generally horizontal conveyor belt, the height of the belt above the sock utilizing gravity to provide any desired velocity at entrance. Fruit delivery here may be accomplished by a flat belt, by flighted belt, or by counter rotating soft rollers, all in order to impart high velocity and hence high momentum to the fruit. De-stemming can also be enhanced by imparting a vertical oscillating motion to the socket assembly, thereby imparting higher decelerations to the fruits. Such motion so increases the stemming effectiveness of the system that it enables use of the process with fruit varieties which have high stem detachment force requirements. The oscillation of the sock also serves to promote continued fruit movement downward through the sock, so that fruit movement is less dependent on gravitational force. As a result, a smaller diameter sock can be utilized for ensuring high stemming efficiency for very small fruits.

Stemming efficiency is also improved when the fruits enter the sock or tube at an angle with respect to the sock or tube axis, so that the first contact of the tomatoes with the sock is made near the entrance of the sock, and the full length of the sock is thus available, if needed, to provide opportunity for stem entrapment in the mesh as the fruit moves downward.

The sock may be oriented approximately in line with the trough which delivers the fruit to the entrance into the sock; the sock may then be supported at an angle by a perforated flat surface such as semi-rigid or rigid large mesh netting. Netting provides increased opportunity for the stems to rotate and align in any orientation, and the inclined configuration of the support surface promotes rolling of the fruit as it moves through the sock. The sock may then be oscillated by driving the upper end alone or by driving both the upper and lower ends in the same direction simultaneously.

Large tomatoes tend to be slowed in their travel downward through the sock by virtue of the mild gripping action of the resilient sock material. Thus, when there is continuous flow of fruit, the individual tomatoes tend to be in direct contact with each other, especially as smaller tomatoes tend to catch up with larger ones. This further promotes stem entrapment, for it effects additional jostling of the tomatoes and changes in fruit orientation, and thus increases the number of opportunities for entanglement of the stem in the web and the resultant interaction.

Stemming efficiency is partly dependent upon the ability of the fruit to jostle and rotate within the sleeve. A large percentage of fruit is de-stemmed in the funnel-shaped entrance to the sock because of the openness of this area.

In an alternate construction, the sock may be provided deflection chevrons to isolate several areas, control the fruit flow through the stemming areas depending upon the angle of the deflection chevrons, and upon the percentage of the total opening which is blocked. A cross piece may prevent the fruit from going straight through the center of the tube without making contact with the mesh walls. Deflection chevrons can be placed in various places in a single plane or in several planes.

Fruit collection from the sock end can be accomplished by use of foam-padded deflector plates, by direct discharge onto a minimally supported flat belt conveyor, or by discharging the fruits directly into a tank of water, the water serving as a fruit cushion. A conveyor may carry the fruit from the tank.

BRIEF DESCRIPTION OF THE DRAWINGS

FIG. 6 is a view in side elevation of a modified form of de-stemming apparatus according to the invention, employing feeding troughs above and an unsupported conveyor belt below the sock or socks.

FIG. 7 is a view in end elevation of the device of FIG. 6, showing how each trough feeds one sock.

FIG. 8 is a view similar to FIG. 3 of a modified form of de-stemming apparatus according to the invention, wherein the upper end of the sock or socks is oscillated, and wherein the fruit falls from the sock into a water tank.

FIG. 9 is a view in side elevation of a modified form of de-stemming apparatus according to the invention, wherein an inclined surface supports the sock and in which a conveyor belt delivers the tomatoes to the upper end of the inclined sock.

FIG. 10 is a view similar to FIG. 9 of another modified form of de-stemming apparatus, according to the invention, showing somewhat diagrammatically a vertical sock oscillator, fruit being delivered to the upper end of the sock by soft-surfaced counter-rotating wheels.

FIG. 11 is a view similar to FIG. 10 another modified form of de-stemming apparatus according to the invention, showing somewhat diagrammatically the use therewith of oscillation along the plane of a supporting surface, the upper end only of the sock being oscillated. Fruit is delivered to the sock by a flighted conveyor.

FIG. 12 is a view similar to FIG. 11 of yet another modified form of de-stemming apparatus embodying the principles of the invention and differing from that of FIG. 11 in that both the upper and lower ends of the sock are attached to the supporting surface for oscillation in line with the axis of the surface.

FIG. 13 is a diagrammatic view in front elevation of a modified form of de-stemming sock according to the invention; this sock is provided with deflection chevrons, e.g., narrow strips of cloth sewn to the sock so as to hold or pinch together two opposing sock surface portions, so that the tomato must pass around it.

FIG. 14 is a view in side elevation of the de-stemming sock of FIG. 13.

FIG. 15 is a view in front elevation of a modified form of de-stemming sock according to the invention having a different shape of deflection chevron.

FIG. 16 is a view in side elevation of the de-stemming sock of FIG. 15.

FIG. 17 is a view in elevation of a modified form of de-stemming sock of the invention having chevrons located, for example, 90° apart, so that the fruit rotates as it drops.

FIG. 18 is a top plan view of the sock of FIG. 17.

FIG. 19 is a view in elevation of another modified form of de-stemming sock of the invention having chevrons, wherein there is apparatus to cause movement of the sock as a whole.

DESCRIPTION OF THE PREFERRED EMBODIMENTS

Figure 1:
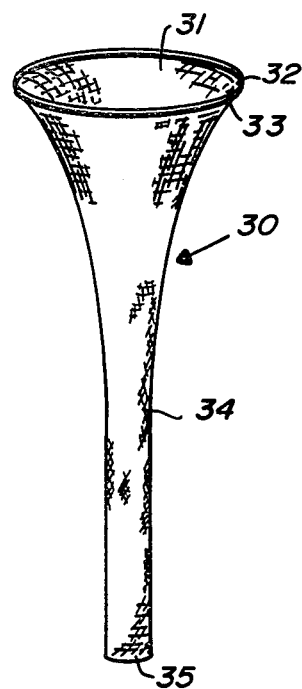
FIG. 1 is a view in perspective of a tomato de-stemming sock embodying the principles of the invention.
Figure 2:
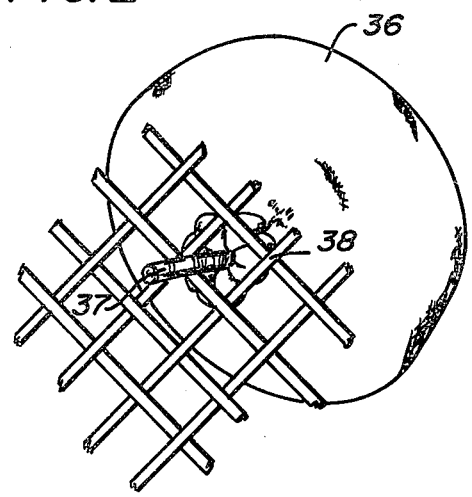
FIG. 2 is an enlarged fragmentary view of a portion of the sock of FIG. 1 shown with a tomato, the stem of which has penetrated the mesh and is entrapped there, so that as the tomato falls the stem will be broken off.

FIGS. 1 and 2 illustrate one form of the invention. A sock 30 made from resilient open-mesh material such as nylon, polyethylene, or other plastic, for example, is preferably provided with an enlarged funnel-shaped upper end 31 preferably having a rigid or semi-rigid circular support 32 in a hollow seam 33. The tomatoes drop or slide into the upper end 31 and then fall down through the funnel-shaped portion 31 into a smaller diameter cylindrical main body 34, preferably only slightly larger in diameter than the tomatoes that are to pass through it and exit through a lower end 35. As shown in FIG. 2, a tomato 36 has a stem 37, which has penetrated through the mesh 38 of the fabric and has been entrapped there. Thus, the stem 37 is easily broken off as the tomato 36 continues its downward movement, for the tomato 36 exerts a bending moment on the stem 37, both because of the tomato's weight and its momentum, and this bending moment is sufficient to snap the stem 37 off the tomato 36.

Figure 3:
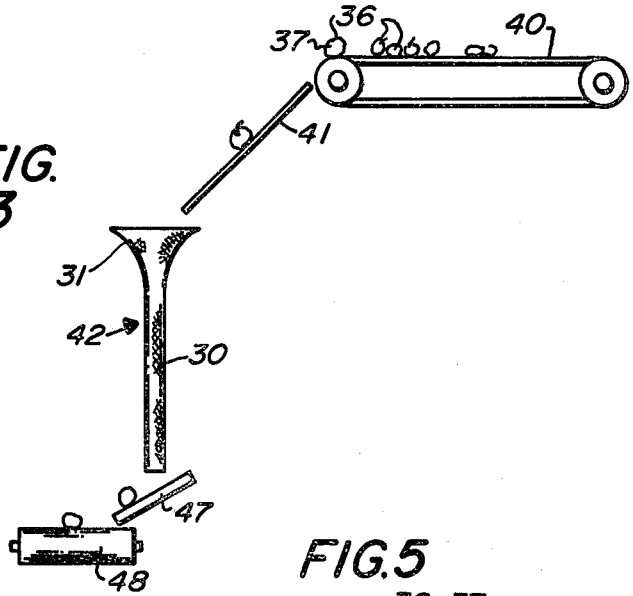
FIG. 3 is a view in side elevation of a de-stemming apparatus embodying the principles of the invention employing a sock like that of FIG. 1 in conjunction with a delivery conveyor and a flat inclined surface for feeding tomatoes to the sock, and a pad-and-conveyor collecting system below the sock.
Figure 4:
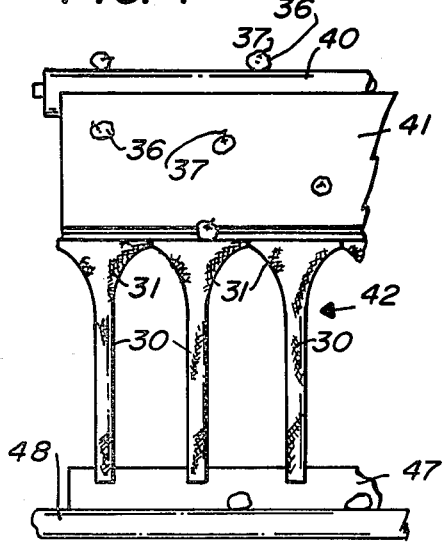
FIG. 4 is a fragmentary view in end elevation of an apparatus like that of FIG. 3 employing a series of socks.
Figure 5:
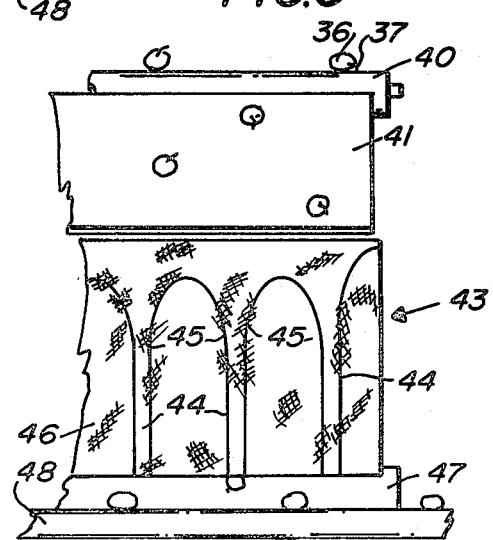
FIG. 5 is a view similar to FIG. 4 showing a modified form of sock configuration according to the invention, where the socks are joined to each other.

FIGS. 3 through 5 illustrate one form of apparatus according to this invention. In this form of the invention, a delivery conveyor 40 carries the fruit 36 with its stem 37, to a flat inclined slide 41, which guides the fruit into a sock assembly, 42, which may, as shown in FIGS. 3 and 4, comprise simply a series of individual socks 30 like that shown in FIG. 1, or may instead comprise a sock assembly 43 like that shown in FIG. 5 providing a set of socks 44 with internal sewn or formed seams 45 and connecting webs 46. In either event, the sock may have either a round or a square upper end 31, which imparts the funnel shape at the upper end.

The tomatoes fall from the flat inclined surface 41 into the sock assembly 42 or 43 at an initial velocity suitable to the variety of tomato etc., and this velocity together with the force of succeeding tomatoes 36 that fall and come against the others, reorienting them, enables the entangling action of the stem 37 in the mesh 38 to accomplish the desired de-stemming. From the lower end 35, the tomatoes may fall upon a pad 47, which may be of sponge rubber or similar material and which may be inclined to guide the fruit coming out from the lower end 35 of the sock onto a suitable conveyor 48.

In the apparatus of FIGS. 6 and 7 the net assembly or sock structure may be that of either FIG. 4 or FIG. 5, but in FIGS. 6 and 7 in place of the flat inclined slide 41, the fruit is delivered to the sock assembly from the conveyor 40 to a trough assembly 50 comprising a series of troughs 51, preferably one for each sock 30. At the lower end is another variation, the tomatoes 36 are delivered from the lower end 35 of each sock 30 to an unsupported conveyor belt 52 which cushions the fall and then conveys the fruit to another location. It will be apparent that either the trough assembly 50, or the unsupported conveyor belt 52, or both could be used with the apparatus of FIGS. 3 to 5, if desired, and that any component of the apparatus of FIGS. 3 to 5 could be used with the apparatus of FIGS. 6 and 7.

FIG. 8 shows yet another variation of the system which may use either type of input to the upper end of the sock. In this apparatus the rigid ring 32 at the upper end of the sock 30 is attached to an oscillating apparatus 53 comprising a lever 54 having a crank arm 55 and mounted on a pivot 56. The crank 55 is secured to motor-driven eccentric wheel 57. Since the sock 30 freely hangs vertically, the oscillation is generally vertical about a short arc, the arcuate motion being inconsequential. As another variation of the output system, FIG. 8 shows the fruit falling from the lower end 35 of the sock 30 into a tank 58 of water that cushions the fall and from which a conveyor 59 lifts it up for delivery elsewhere.

FIG. 9 is the first of a series of illustrations (FIGS. 9-12) in which the sock 30, instead of hanging freely and vertically, is given support by an inclined surface 60. Contact of the tomato with the underside-supported surface of the sock 30 promotes rolling of the fruit, destabilizing the fruit's position and orientation, while the open mesh enables stem penetration. The delivery to the upper end of the sock 30 may be accomplished directly by an inclined conveyor belt 62 from the lower end of which, the tomato drops into the funnel portion 31 of the sock 30 at an angle to the axis of the sock 30.

FIG. 10 shows a similar supported and inclined sock. In this instance, the upper end of the support surface 60 may be attached to the sock 30 and vertically oscillated with it, so that a vertical up and down movement is imparted, or the surface 60 may be held stationary and the sock 30 vertically oscillated relatively to the surface 60. Delivery to the sock 30 is accomplished by a pair of soft surface counter rotating wheels or rollers 61 and 62.

In FIG. 11 there is again oscillation. Either the surface 60 is secured to the sock 30 and the entire support surface assembly 60 oscillated with the sock 30 in the plane of the open mesh support surface 60, or the surface 60 may remain stationary while the sock 30 is oscillated in a plane parallel to it.

Also, the introduction of the fruit to the sock is accomplished by a flighted belt 65 having a small diameter pulley 66 that gives high tip velocity to the flights, and therefore a high exit velocity of the fruit into the sock 30.

FIG. 12 shows an inclined and supported sock with an optional shaker attachment 53a to the lower end 35 of the sock 30, to enable oscillation of both ends simultaneously, while the surface 60 remains fixed and stationary. The two ends of the sock may be connected to the same oscillator or to different ones.

FIGS. 13 to 16 illustrate the use of fabric socks 70 that instead of having a cylindrical shape are flatter. They have an upper funnel-like portion 71 and have deflection chevrons 72, 73, 74 which extend partially across the width of the sock 70. These chevrons 72, 73, 74 are narrow strips or tapes of cloth sewn to two generally opposite portions of the sock 70 so as to pinch those surfaces together. They are preferably sloped to guide the fruit toward the inner ends of the chevrons. The sock 70, in this instance is much greater in diameter than the fruit, while the chevrons are spaced apart by distances only slightly greater than the diameter of the fruit. As shown in FIGS. 13 and 14, inclined chevrons 72, 73, and 74 are staggered and send the fruit from one side to the other of the sock during the descent, thereby both slowing the passage of the fruit and helping to ensure entanglement in the mesh and resultant de-stemming once there is entanglement of the stem.

FIGS. 15 and 16 show a different form of chevron 75, where the cloth-strip chevrons 75, 76 are again used to hold two opposite sock surfaces together. Here the chevrons 75, 76 face each other directly to provide restrictions at intervals.

FIGS. 17 and 18 show another type of sock 80 causing rotation of the fruit as it descends. Here, chevrons 81, 82, 83, and 84 in this instance, instead of lying along a single plane, as in FIGS. 13 to 16, are placed on different planes. By setting them below one another and also at 90° to the ones above and below, the chevrons 81, 82, 83, and 84 impel rotation of the fruit and increase the opportunities for entanglement.

FIG. 19 shows a sock 85 with means for improving the transmission of oscillating motion to its lower part. Flexible tensile strips 86 and 87 are attached to the sock and connect an entrance hoop 88 to lower portions of the sock 85 along a plane common to deflection chevrons 89. This structure transmits positive motion to the deflection chevrons 89 during upward sleeve movement, while the fruit weight provides the needed downward force.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A process for de-stemming picked tomatoes, comprising
    introducing each tomato having a stem into the upper end of a generally vertically disposed, open-ended, resilient, open-mesh fabric tube, a substantial portion of which approximates but is larger than the diameter of the tomato, and allowing the fruit to fall through the tube and causing the stem to penetrate into and through the open mesh, the open areas of which are each somewhat larger than the stem, while the tomato continues to fall, thereby
    exerting a bending moment on the stem due to the combination of the effects of fruit weight and momentum that snaps the stem from the fruit,
    discharging the tomato, free from its stem, from a lower end of said tube, and
    subsequently discharging the loose stem from said lower end.

2. The process of claim 1 wherein said introducing step comprises introducing the tomato into said upper end at substantial velocity.

3. The process of claim 2 wherein the substantial velocity is achieved by dropping the tomatoes from a predetermined height above the tube.

4. The process of claim 2 wherein the substantial velocity is achieved by rolling the tomato down an inclined path of predetermined length and inclination.

5. The process of claim 2 wherein the substantial velocity is achieved by passing the tomato between a pair of cushioned, driven, counter-rotating rollers that impel the tomato down into the tube.

6. The process of claim 1 including the step of imparting an oscillating motion to the tube.

7. The process of claim 6 wherein the imparting step comprises imparting a vertical oscillation.

8. The process of claim 6 wherein the imparting step comprises imparting oscillation axially of the tube.

9. The process of claim 1 including sending the tomato from one side to the other as it falls through the tube, with reversal of direction.

10. The process of claim 1 including guiding the descending tomato along a generally helical path inside the tube.

11. The process of claim 1 including passing the tomato inside the tube from successively wide and narrow tube portions.

12. The process of claim 1 including supporting said tube on one side of retaining it at an angle to vertical.

13. The process of claim 12 including oscillating the tube generally vertically while its support remains stationary.

14. The process of claim 12 including oscillating the tube and its support in a generally vertical plane.

15. The process of claim 12 including oscillating the tube parallel to its plane of support while the support remains stationary.

16. The process of claim 12 including oscillating both the tube and its support in the plane of support.

17. The process of claim 1 wherein said introducing step comprises introducing the tomato into the tube at an angle with respect to the axis of the tube, so that the tomato first comes into contact with the tube near said upper end, thereby increasing the opportunity for entrapment of the stem in the mesh there and elsewhere along the full-length of said tube.

18. The process of claim 1 comprises introducing the fruit in quantity and causing the fruit to pass through the tube serially and often in contact with the immediately succeeding fruit, so that there is additional jostling and fruit reorientation, thereby increasing the probability of stem entanglement in the open mesh.

19. The process of claim 1 having the step of dropping the fruit from said lower end onto a shock absorbing material, to minimize damage to the fruit.

20. The process of claim 19 wherein the dropping step comprises dropping the fruit onto foam-padded deflector plates.

21. The process of claim 19 wherein the dropping step comprises dropping the fruit onto a minimally supported flat belt conveyor.

22. The process of claim 19 wherein the dropping step comprises dropping the fruit into a tank of water.

23. A process for de-stemming picked tomatoes, comprising
    introducing at substantial velocity each tomato having a stem into the upper end of a generally vertically disposed, open-ended, resilient, open-mesh fabric tube, a substantial portion of which approximately but is larger than the diameter of the tomato, and allowing the fruit to fall through the tube and causing the stem to penetrate into and through the open mesh, the open areas of which are between 3/16" and ⅜" wide, while the tomato continues to fall, thereby
    exerting a bending moment on the stem due to the combination of the effects of fruit weight and momentum that snaps the stem from the fruit,
    discharging the tomato, free from its stem, from a lower end of said tube, and subsequently discharging the loose stem from said lower end onto a shock-absorbing medium.

24. A process for de-stemming picked fruit of the type where the stem tends to break readily at its juncture with the fruit, comprising introducing each said fruit having a stem into the upper end of a generally vertically disposed, open-ended, resilient, open-mesh fabric tube, a substantial portion of which approximates but is larger than the diameter of the fruit, and allowing the fruit to fall through the tube and causing the stem to penetrate into and through the open mesh, the open areas of which are each somewhat larger than the stem, while the fruit continues to fall, thereby exerting a bending moment on the stem due to the combination of the effects of fruit weight and momentum that snaps the stem from the fruit, discharging the fruit, free from its stem, from a lower end of said tube, and subsequently discharging the loose stem from said lower end.

25. The process of claim 24 wherein said introducing step comprises introducing the fruit into said upper end at substantial velocity.

26. The process of claim 24 including the step of imparting an oscillating motion to the tube.

27. The process of claim 24 including sending the fruit from one side to the other as it falls through the tube, with reversal of direction.

28. The process of claim 24 including guiding the descending fruit along a generally helical path inside the tube.

29. The process of claim 24 including passing the fruit inside the tube through successively wide and narrow tube portions.

30. The process of claim 24 including supporting said tube on one side and retaining it at an angle to vertical.

31. The process of claim 24 wherein said introducing step comprises introducing the fruit into the tube at an angle with respect to the axis of the tube, so that the fruit first comes into contact with the tube near said upper end, thereby increasing the opportunity for entrapment of the stem in the mesh there and elsewhere along the full-length of said tube.

32. The process of claim 24 comprising introducing the fruit in quantity and causing the fruit to pass through the tube serially and often in contact with the immediately succeeding fruit, so that there is additional jostling and fruit reorientation, thereby increasing the probability of stem entanglement in the open mesh.

33. The process of claim 24 having the step of dropping the fruit from said lower end onto a shock absorbing material, to minimize damage to the fruit.

* * * * *